United States Patent [19]

Kennedy, Jr. et al.

[11] 4,026,586

[45] May 31, 1977

[54] PLAIN END PIPE JOINT

[75] Inventors: Harold Kennedy, Jr.; Robert M. Graham, both of Birmingham, Ala.

[73] Assignee: United States Pipe and Foundry Company, Birmingham, Ala.

[22] Filed: Mar. 15, 1976

[21] Appl. No.: 666,629

[52] U.S. Cl. .............................. 285/236; 285/61; 285/373

[51] Int. Cl.² ......................................... F16L 21/06

[58] Field of Search .......... 285/236, 373, 419, 369; 138/99

[56] References Cited

UNITED STATES PATENTS

| 848,139 | 3/1907 | Stuppar | 138/99 |
|---|---|---|---|
| 2,227,551 | 1/1941 | Morris | 138/99 X |
| 3,104,898 | 9/1963 | MacDonald et al. | 285/236 |
| 3,211,475 | 10/1965 | Freed et al. | 285/236 X |
| 3,239,254 | 3/1966 | Campbell | 285/419 X |
| 3,565,468 | 2/1971 | Garrett | 285/373 |
| 3,627,353 | 12/1971 | Blumenfeld | 285/236 X |
| 3,700,008 | 10/1972 | Hackman | 285/373 X |
| 3,801,141 | 4/1974 | Hollingsworth | 285/236 |
| 3,944,265 | 3/1976 | Hiemstra et al. | 285/373 X |

FOREIGN PATENTS OR APPLICATIONS

| 497,239 | 8/1950 | Belgium | 285/236 |
|---|---|---|---|
| 1,282,373 | 11/1968 | Germany | 285/373 |

*Primary Examiner*—Thomas F. Callaghan
*Attorney, Agent, or Firm*—James W. Grace

[57] ABSTRACT

A coupling for joining the plain ends of pipe; specifically, plain ended, cast iron soil pipe or plastic drain, waste and vent piping. The coupling is particularly adapted to ease of construction and yet furnishes the ability to join and seal pipe and fittings of a given nominal diameter over the full range of their tolerances with excellent rigidity.

1 Claim, 5 Drawing Figures

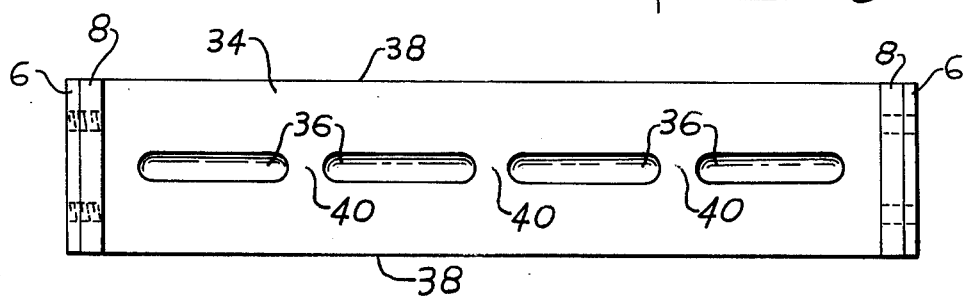
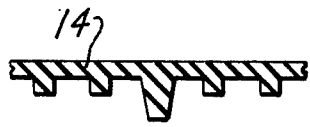

PLAIN END PIPE JOINT

BACKGROUND OF THE INVENTION

1. Field of the Invention

This invention is in the field of joining waste or drain pipe, more particularly, in the field of joining plain ended waste pipe installed mainly in buildings above ground although the coupling can also be used underground.

2. Description of the Prior Art

For many years the production of cast iron soil pipe made use of sand molds. Both pipe and fittings were produced in such molds to tolerances compatible with the process. Of late, most soil pipe are cast in metal molds where tolerances of a closer nature can be maintained. However, since both processes are in practice, it is necessary to maintain a rather wide tolerance between the maximum and the minimum outside diameter of soil pipe and fittings. Also, since these products must be joined together in a leak free system, the coupling must be compatible with the relatively wide range of dimensions encountered. For instance, one may expect to encounter in a 4 inch nominal size pipe line outside diameters of 4.44 inches and 4.32 inches which must be joined together. A number of sleeve type joining methods have been proposed utilizing a fixed sleeve with a rubber sleeve insert into which are inserted the ends of pipe to be joined. A sleeve of this nature would offer excellent rigidity; however, this type joining method has not been successful due to the relatively wide variation in outside diameters.

Several couplings for joining soil pipe are in commercial use, both patented and unpatented. Probably the most widely used is revealed by Gordon Evans in his U.S. Pat. No. 3,233,922. While the Evans device produces a satisfactory joining method under most conditions, it is made up of several specially formed members requiring time consuming assembly. There is also a clamping device known commercially as AKO used for joining plain ended pipe wherein a plain steel strip is formed around a sleeve type rubber gasket. This method utilizes bolts through holes in each end of the strip to clamp the gasket against the outside surfaces of pipe inserted therein. However, this type clamp does not have the ability to seal pipe ends of varying diameter and is used mainly in Europe where tolerances are relatively small. Such a clamp was tested by joining two soil pipe of the same nominal diameter, one of the ends joined being at the minimum tolerance and other at the maximum tolerance. Leakage occurred at a pressure below that considered acceptable. The present invention eliminates the need for complex members and improves the utility of the joining device without giving up its versatility.

SUMMARY OF THE INVENTION

The present invention comprises an elongated clamping strip reinforced at its ends and having edges that will under a given load deform more than its central portion and also having a short strip to bridge the area where the two ends of the clamping strip are clamped together and two standard bolts to accomplish the clamping. The same type rubber packing ring described in the Evans patent is employed.

Many complex clamping members could be made which would have edges that would form circles of different diameters and thus compress a seal member against pipe having different diameters. Such clamping members could be made with thin edge portions and a thick central portion or conversely with thick edge portions and a thin central portion. The purpose of the thin and thick portions being to provide different strain characteristics. Obviously a coupling so made would be unreasonably expensive. However, the present invention provides a simple solution to the problem of clamping around adjoining pipe of different diameters. A clamping member is provided wherein either edge portion under a given load will deform more than its central portion or has a central portion which under a given load will deform more than either edge portion. The clamping member may be made from a metal strip of uniform thickness.

It is thus an object of this invention to eliminate any separate tightening straps of the Evans device and thus their tendency to slide off the elongated corrugated strip and also eliminate their specially formed tightening units with special screws while maintaining the rigidity and the versatility of the joining method.

DESCRIPTION OF THE DRAWING

FIG. 4 is a cross section of the elastic seal member.

FIG. 5 is a plan view of an alternate embodiment of the elongated metal strip.

DESCRIPTION OF THE PREFERRED EMBODIMENT

Figure 1:
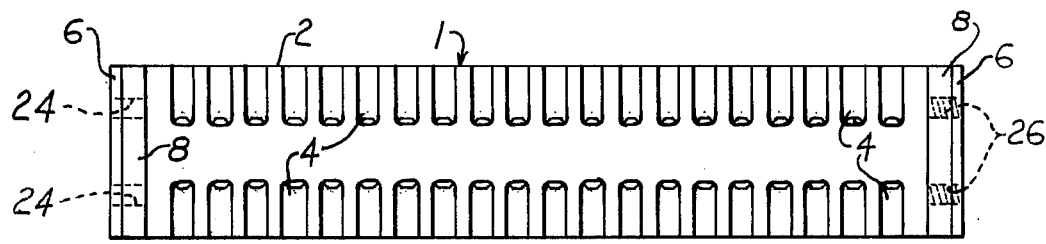
FIG. 1 is a plan view of the elongated metal strip with reinforced ends.
Figure 3:
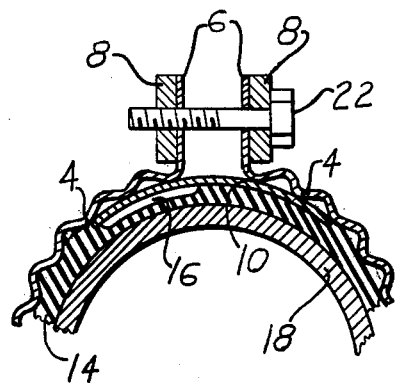
FIG. 3 is a fragmented sectional elevation taken along the lines 3—3 shown on FIG. 2.
Figure 2:
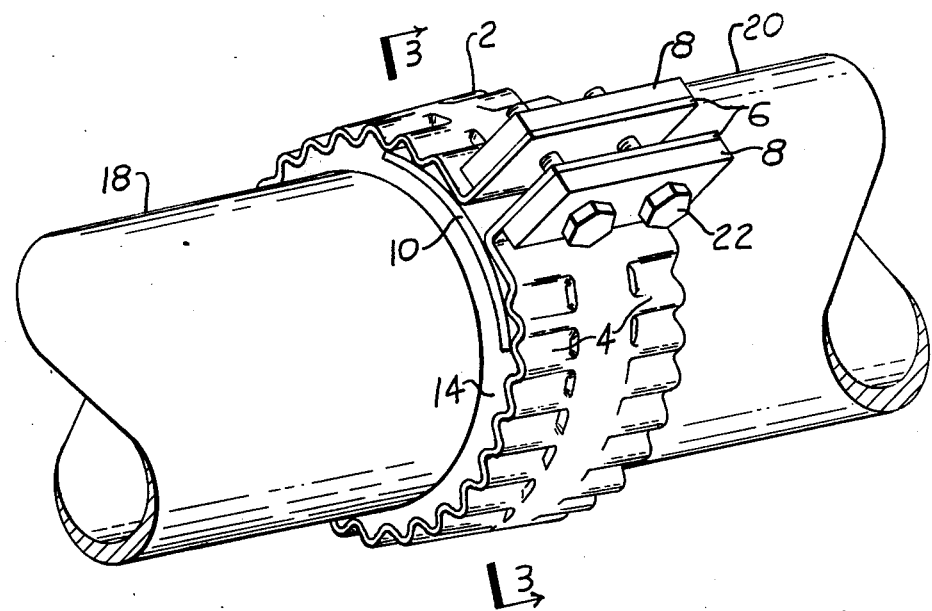
FIG. 2 is a perspective of the device assembled around the ends of two pipe.

The invention can best be understood by referring to the drawings and, more particularly, to FIGS. 1 and 2 where the clamping strip is indicated generally by the number 1. The elongated strip 2 has corrugations 4 which are raised above the remainder of strip 2, i.e., the corrugations 4 protrude outwardly when the device is in place around a pipe. Corrugations 4 preferably extend inwardly from each edge of strip 2 almost to the middle of the strip. Thus, the central portion of strip 2 is not corrugated. Good results have been obtained with from ⅛ to ½ of the strip being uncorrugated. It should be understood, however, that it is the ability of the edges of stip 2 to deform differently from the central portion which allows the coupling to clamp securely pipe of the same or slightly different diameters. The ends 6 of strip 2 are bent a right angle to the remainder of the strip and reinforcing plates 8 are attached to ends 6, preferably by riveting or spot welding. A short bridging strip 10 is furnished spanning the opening between the ends 6 of strip 2 when the elongated strip 2 is in clamping engagement with elastic seal member 14. Bridging strip 10 shown in FIG. 3 also has corrugations 16 which serve as stiffeners. Pipe ends 18 and 20 are first inserted into seal member 14 which has been preassembled inside a circle formed by strip member 1 and bridging strip 10. A bolt 22 is placed through each hole 24 of strip member 1 and then engaged with the threads in each hole 26. The bolts 22 so placed are tightened to clamp the seal member 14 firmly against the pipe ends 18 and 20. It should be noted that the outer edge portions of the elongated strip 2, having corrugations 4, are capable of tightening independently of each other. These corrugations provide ease of deformation in a circumferential direction, allowing the corrugated outer edge portions to compress seal member 14 against pipe ends of different diameters. Since the flat inner portion of the elongated strip also clamps the seal member directly against the pipe ends, a more rigid joint results than would were the entire strip corrugated. The corrugations further provide a space for a portion of seal member 14 to be extruded into. This extrusion of the seal member further permitting the corrugated edge portions to compress seal member 14 against pipe ends of different diameter. It is this capability which permits the device to seal the joint between pipe ends 18 and 20 even though the pipe ends differ in outside diameter. Tests made on 4 inch standard cast iron soil pipe showed the joint was sealed properly even though one pipe was the minimum permissible and the other was the maximum permissible. Further, this method clamping provides sufficient stiffness across the joint to allow a line of pipe thus joined to be suspended by a hanger attached to bolts 22.

An alternate embodiment of the invention is shown in FIG. 5. This embodiment differs from the preferred in that perforations or openings 36 are cut in strip 34 along its longitudinal center line which allow edge portions 38 to tighten around different diameters. The areas 40 between the perforations or openings 36 are sufficient to provide rigidity to the joint when strip 34 is in clamping engagement with the pipe and seal member.

By altering the elongated strip in such a manner that its opposite edge portions may form circles of different diameters, the seal member may be compressed against the periphery of pipe having different diameters.

While there has been illustrated and described a preferred and an alternate embodiment of the invention, these are set forth in illustration of the invention and not as limitation of the invention. It will be apparent to those skilled in the art that changes may be made in the materials and procedures described about without departing from the scope of the invention as set forth in the appended claims.

We claim:

1. A coupling for joining two plain ended pipe sections in end-to-end alignment including a resilient sleeve seal member surrounding and engaging the ends of said pipe sections, an elongated metal strip with two end portions and two edge portions and surrounding and engaging a major portion of said resilient sleeve seal member, the end portions of said elongated metal strip being bent to protrude radially away from said pipe sections; and said end portions being spaced circumferentially apart; and clamp means for urging said end portions closer together and compressing said resilient sleeve seal member into sealing engagement with said pipe ends, the improvement which comprises; said elongated metal strip having successive corrugations extending axially across each edge portion for about one-third of the width thereof to a flat central portion and said successive corrugations being spaced apart from a point near one end to a point near the other end of said elongated metal strip whereby said edge portions will under a given load deform more than said flat central portion.

* * * * *